March 25, 1941. R. D. EASTON 2,236,336
METHOD OF AND MACHINE FOR FEEDING ARTICLES
Filed June 27, 1940 5 Sheets-Sheet 3
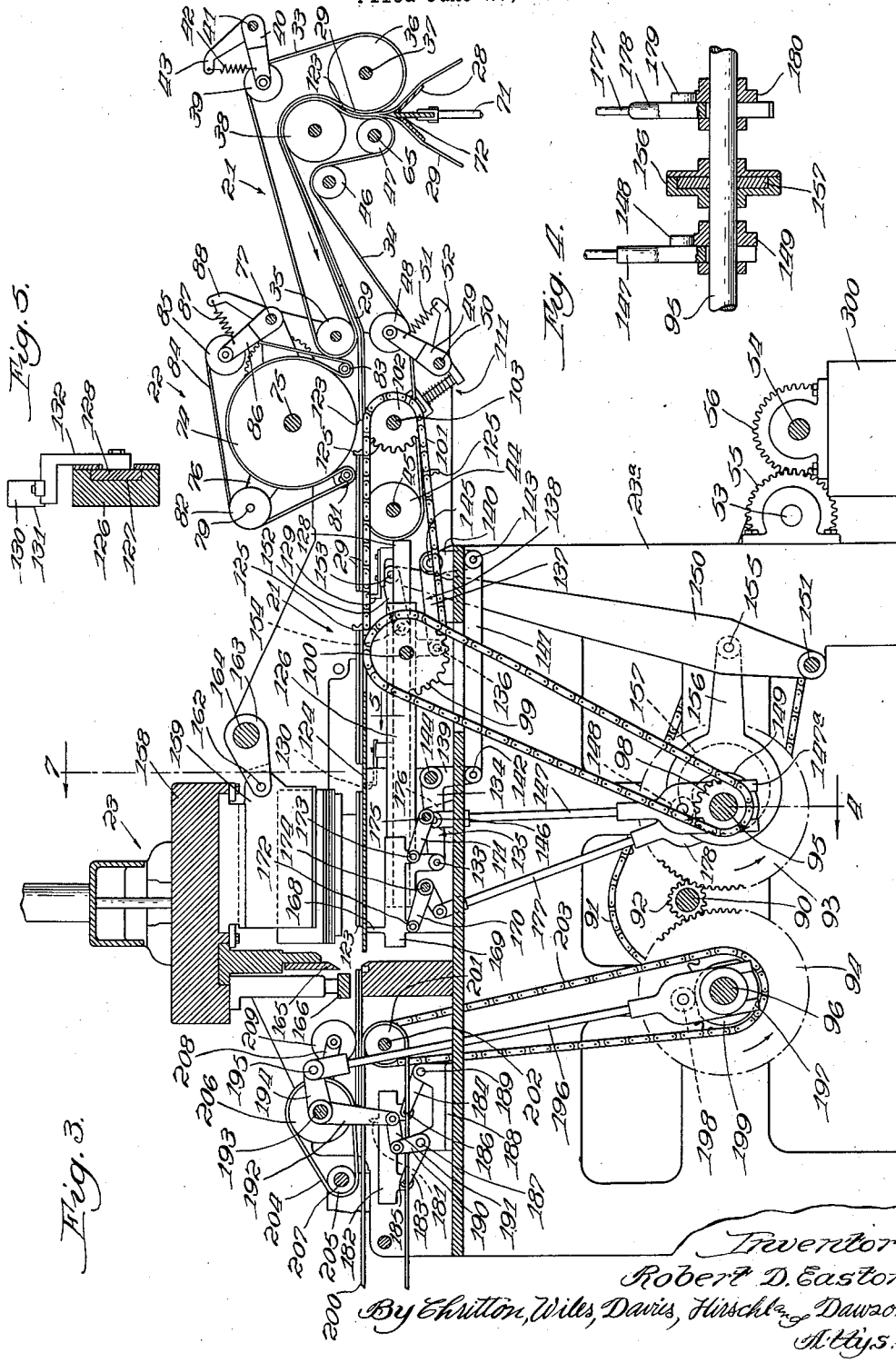
Inventor:
Robert D. Easton.
By Chritton, Wiles, Davis, Hirschl & Dawson.
Attys.

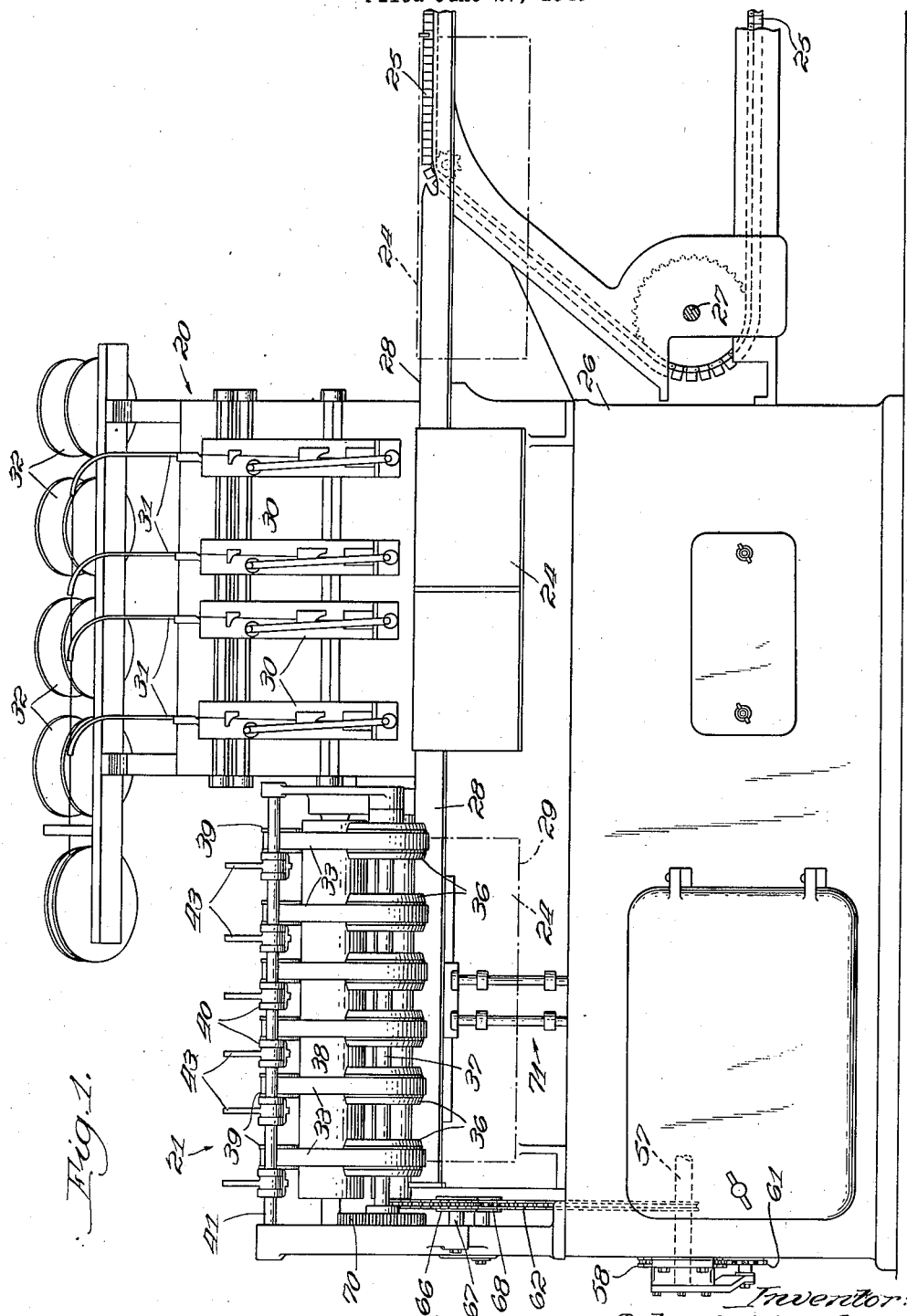

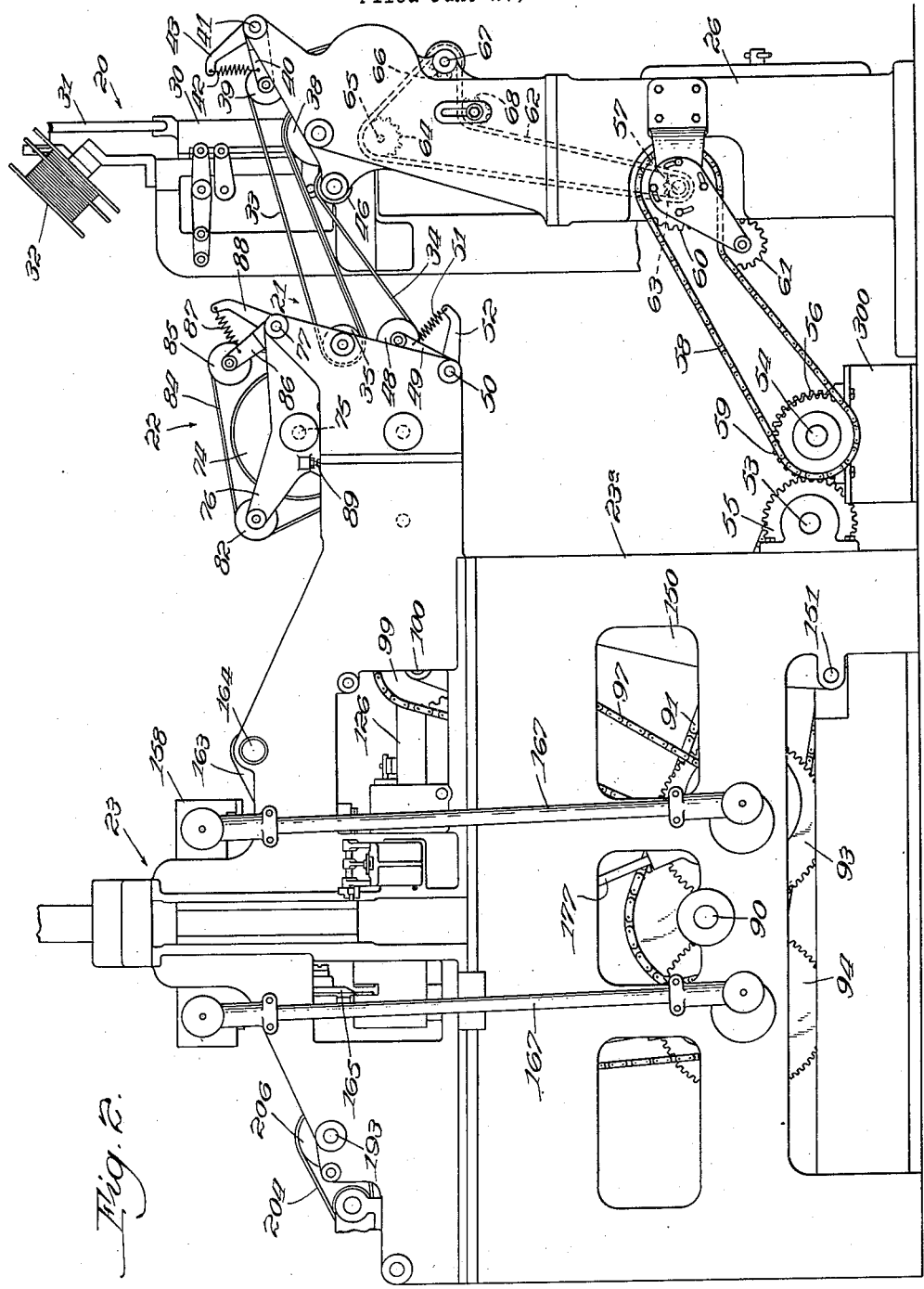

March 25, 1941. R. D. EASTON 2,236,336
METHOD OF AND MACHINE FOR FEEDING ARTICLES
Filed June 27, 1940 5 Sheets-Sheet 4

Inventor:
Robert D. Easton.
By Chritton, Wiles, Davies, Hirsch y Dawson.
Attys.

March 25, 1941.  R. D. EASTON  2,236,336
METHOD OF AND MACHINE FOR FEEDING ARTICLES
Filed June 27, 1940   5 Sheets-Sheet 5
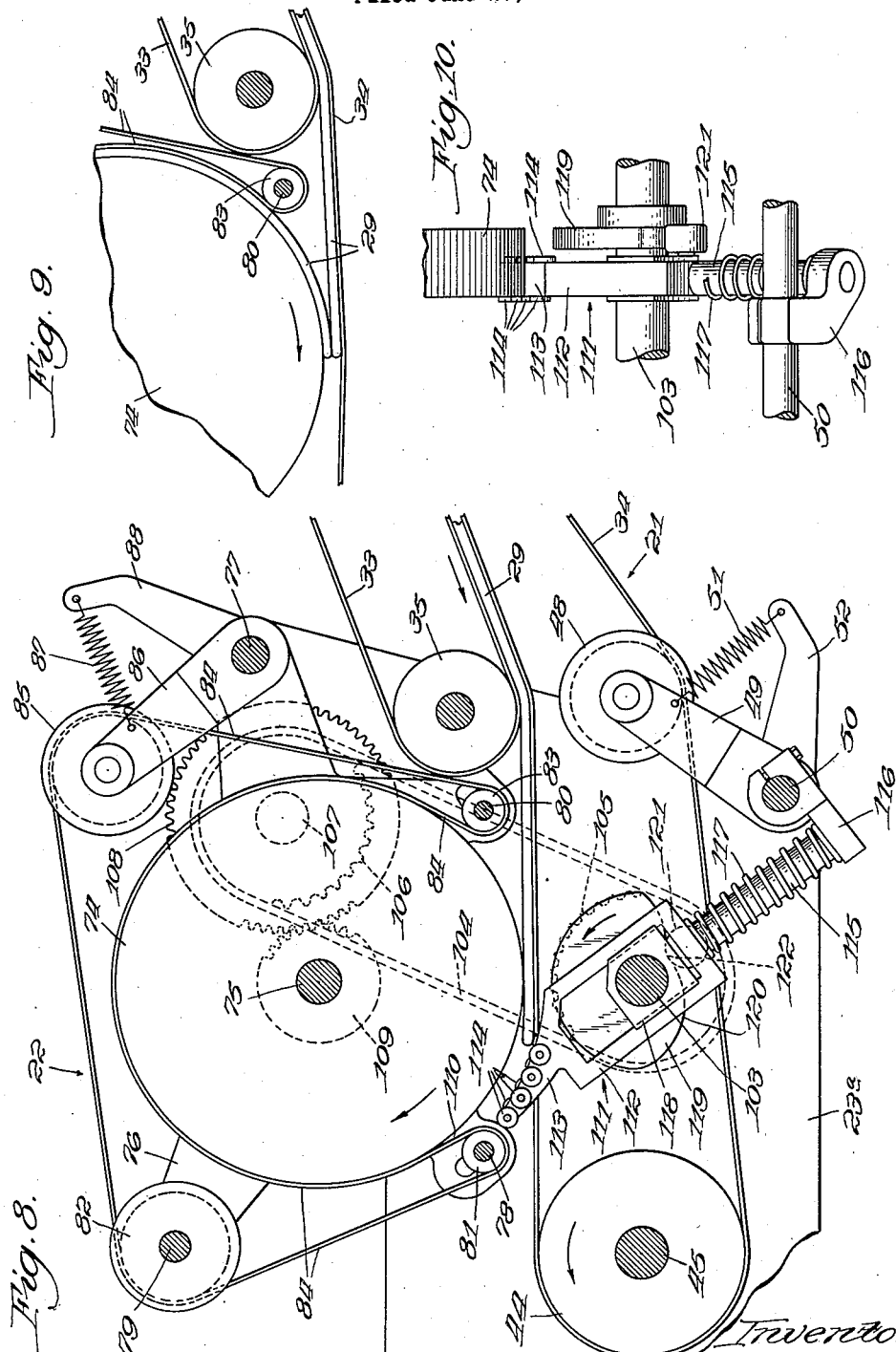
Inventor:
Robert D. Easton.
By Chritton, Wiles, Davis, Hirsch & Dawson. Attys.

Patented Mar. 25, 1941

2,236,336

UNITED STATES PATENT OFFICE 2,236,336

METHOD OF AND MACHINE FOR FEEDING ARTICLES

Robert D. Easton, Chicago, Ill., assignor to R. R. Donnelley & Sons Company, Chicago, Ill., a corporation of Illinois Application June 27, 1940, Serial No. 342,779

21 Claims. (Cl. 270—58)

My invention relates generally to the delivery of articles from one location to another, and involving the stacking of the articles, more particularly, flexible articles, such as for example flexible-cover books, as in the case of magazines, etc.; and especially during the continuous feeding thereof in their course of manufacture.

The invention was devised for use more particularly in connection with the feeding of articles from one mechanism operating to perform certain work on the articles, such as for example a book-stapling mechanism, having a capacity for rapid output, to another mechanism for performing other work on the articles, such as for example book trimming and/or cutting mechanism, inherently operating much slower than the first referred to mechanism, as is characteristic of book trimming and/or cutting mechanism of the reciprocatory type and embodying means for severing into individual books, double books fed thereto and trimming edges of the books—a type of mechanism recognized as the most desirable to be used because of the superior work produced thereby.

As will be apparent, any automatically operating means for feeding the articles from one mechanism to the other in a continuous succession of single articles must be operated to deliver the articles to the second mechanism at a rate not in excess of the adaptability of such mechanism to perform its intended work thereon, and thus being much slower in operation than in the case of the first-referred-to mechanism, the operation of the machine comprising such mechanism is objectionably slow resulting in a slow rate of production.

My object generally stated, is to overcome the above-referred-to objections to prior machines to the end of greatly increasing the output of the machines—limiting them, in the rate of production, only by the speed at which the mechanism first to operate on the articles, performs its work.

One of my more specific objects is to provide a feed mechanism by which the articles fed in succession thereby are caused to become stacked at a predetermined point in their travel in accordance with the predetermined arrangement, and continued to be fed in such stacked condition, as for example and more particularly, an arrangement in which each alternate article is stacked upon the next succeeding article.

Another of my more specific objects is to provide a simple and efficient construction of stacking mechanism. Other more specific objects will be manifest from the following description:

Referring to the accompanying drawings:

Figure 1 is a view in elevation of a machine involving my invention and comprising book stitching mechanism, book trimming and cutting mechanism and intermediate feeding mechanism for feeding the stapled books to the trimming and cutting mechanism.

Figure 2 is likewise is a view in elevation of the machine of Fig. 1 viewing the machine from the left-hand side of Fig. 1.

Figure 3 is a fragmentary view in sectional elevation of the machine, the section being taken at the line 3 on Fig. 6 and viewed in the direction of the arrow.

Figure 4 is a fragmentary sectional view taken at the line 4 on Fig. 3 and viewed in the direction of the arrow.

Figure 5 is a fragmentary sectional view taken at the line 5 on Fig. 3 and viewed in the direction of the arrow.

Figure 8 is an enlarged fragmentary sectional view of the machine, the section being taken at the line 8 on Fig. 6 and viewed in the direction of the arrow, this view illustrating the position of the parts of the stacking mechanism upon initiating the movement of one of the books for stacking it upon the next, succeeding book.

Figure 9 is a similar view of certain of the parts of the mechanism of Fig. 8, this view illustrating the initial delivery of the book of Fig. 8 to superposed position on the succeeding book beneath it; and Figure 10, a fragmentary view, in elevation, of a portion of the mechanism of Fig. 8, the mechanism being viewed from the right in Fig. 8.

Figure 6:
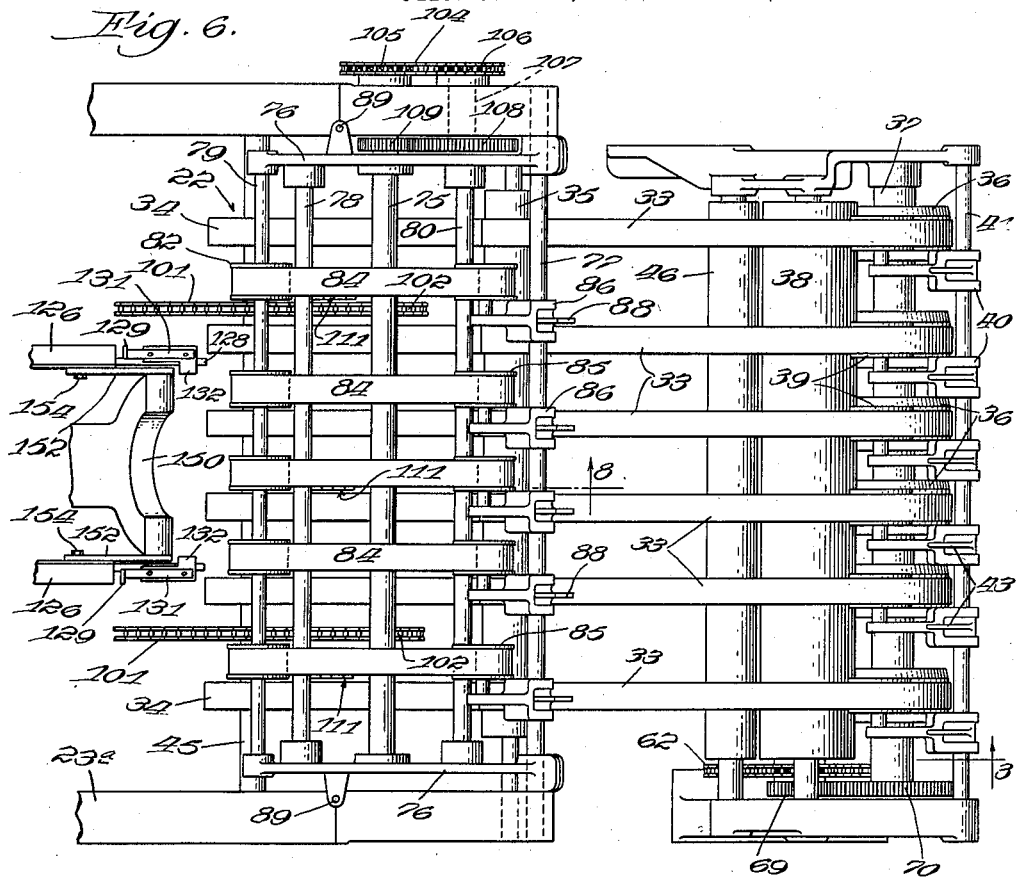
Figure 6 is a fragmentary plan view of the portion of the machine shown in Fig. 3, with the table, forming a part of the machine, omitted.
Figure 7:
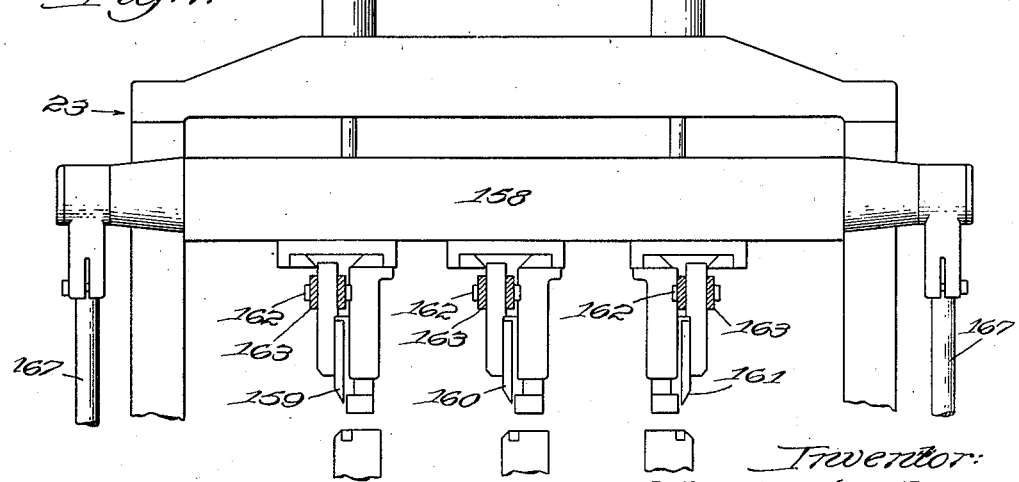
Figure 7 is a sectional view of the machine, the section being taken at the line 7 on Fig. 3 and viewed in the direction of the arrow.

The machine shown comprises, generally stated, book-stitching mechanism represented at 20; mechanism represented at 21 for receiving the stitched books and feeding them in succession to a certain point at which each alternate book is caused to be stacked by stacking mechanism represented generally at 22, on the next, succeeding book, from which point the books, in such stacked condition, continue to be fed, and book trimming and cutting mechanism represented at 23 to which the stacked books are fed by the mechanism 21.

The books are composed usually of signatures customarily assembled, preliminary to being fed to the stitching mechanism, into the sequence desired in the finished book, as by means of a signature-gathering machine (not shown) from which the grouped signatures, represented at 24, are conveyed by means of a continuously operating endless conveyor 25 supported on the frame 26 of the machine and driven through the medium of a shaft 27 operated in any desirable way in the desired timed relation to the operation of the stitching mechanism.

The book-stitching mechanism shown is of well known construction and embodies the general features of construction disclosed in United States Letters Patent No. 1,351,231, granted August 31, 1920, and No. 1,879,040, granted September 27, 1932, and therefore a general description thereof will suffice.

The stitching mechanism 20 comprises an inverted V-shaped support 28 in the form of a bar, to and along which the grouped folded sheets 24 (the signatures) which are to form the books 29 and which straddle the bar 28, are fed (Fig. 3) by the endless conveyor 25; supplemented by feeder means (not shown) located behind the bar 28 which operate intermittently to advance the assembled signatures 24, fed by the conveyor 25, first to a position to be operated on by the staple-applying mechanism of the stitching mechanism 20 (this position being shown in full lines in Fig. 1) and following the stitching operation, to the feeding mechanism 21.

It may here be stated that each of the particular books shown constitutes in reality two complete books when finished, being printed in double-book form and in such condition fed to the trimming and cutting mechanism 23 wherein the double books are cut in half transversely to produce the desired single books and edges thereof trimmed.

The stitching mechanism 20 as shown is so constructed as to apply four staples through the fold of the assembled double-book signatures, each finished book being secured together by two staples.

The stitching mechanism to this end has four spaced apart vertically movable stapling heads 30 fed with staple-forming wire (not shown) through guides 31, from the several reels 32 thereof and operated as shown and described in said Letters Patent, to drive the staples through the fold at the back edges of the assembled signatures while the latter are at rest on the bar 28, following which operation the above referred to intermittently operating feed means of the stitching mechanism advances the stapled books 29 to the conveying mechanism 21; it being understood that the stapling heads 30 are operated in alternation with the above referred to intermittently operating feed means by which the books are fed to and beyond the stapling heads.

The feed mechanism 21 comprises an upper endless belt conveyor formed of a plurality of belts 33 arranged side by side in spaced apart relation and a lower endless belt conveyor comprising a plurality of similar belts 34 similarly spaced apart and in vertical alinement with the belts 33.

The belts 33 are shown as trained over an end roll 35 journaled in the frame 23a of the trimmer mechanism 23 and a series of end rollers 36 rigidly connected with a shaft 37 journaled at its ends in the frame 26; an intermediate roll 38 journaled in the frame 26; and belt-tightening rollers 39 journaled in brackets 40 pivoted on a cross bar 41 stationary on the frame 26, the rollers 39 being pressed against the belts 33 by springs 42 connected with the brackets 40 and with arms 43 stationary on the cross bar 41.

The belts 34 are shown as trained over a series of end rollers 44 rigid on a shaft 45 journaled at its ends in the frame 23a and over the roll 38 and intermediate rolls 46 and 47 journaled in the frame 26; and are engaged by belt-tightening rollers 48 journaled in brackets 49 pivoted on a cross bar 50 stationary on the frame 23a, and pressed against the belts 34 by springs 51 connected with the brackets 49 and with arms 52 rigid on the cross bar 50.

The belts 33 thus extend in flatwise contact with the opposed belts 34 at and between the rolls 35 and 38 but are slightly spaced apart between the roll 47 and the rollers 36 adjacent to which the stapled books 29 are fed into the bite between the belts 33 and 34, as hereinafter described, these belts being driven in the direction of the arrows in Fig. 3.

The drive for the conveyor belts 33 and 34 comprises a shaft 53 journaled in the frame 23a and continuously driven by any suitable power device, as for example a motor (not shown); a shaft 54 journaled on a base 300 and connected with the shaft 53 by intermeshing gears 55 and 56 on these shafts; a shaft 57 journaled on the frame 26 and connected with the shaft 54 by a sprocket chain 58 trained over sprockets 59 and 60 and meshing with a chain-tightening sprocket 61 adjustably supported on the frame 26; a sprocket chain 62 trained about a sprocket 63 on the shaft 57, a sprocket 64 on the shaft 65 of the roll 47 and about a sprocket 66 on a shaft 67 journaled in the frame 26, the chain 62 meshing with a chain-tightening sprocket 68 vertically adjustable on the frame 26; and intermeshing gears 69 and 70 (Fig. 6) on the shafts 65 and 37, respectively; whereby the rollers 36 are driven by the roll 65, but in the opposite direction.

As customary, the machine is provided with means, operating in timed relation to the movement of the books along the bar 28 from the stitching mechanism 20, for feeding the stapled books to the conveyor belts 33 and 34, these means comprising a vertically movable pusher-bar 71 (Fig. 3) at the underside of the bar 28 and operating through a slot 72 in this bar. When the bar 71 is raised from the position shown in Fig. 3 it engages the inside of the book at its fold and forces it into the bite between the conveyor belts 33 and 34 for feeding the book to the stacking mechanism 22.

Co-operating with the feed mechanism 21 is the stacking mechanism referred to and represented at 22, this mechanism, which is located directly above the belts 34, comprising rollers 74 rigidly secured to a shaft 75 journaled at its ends in a pair of horizontally spaced spider frames 76 secured to a shaft 77 to one side of the shaft 75 and rockably mounted at its ends in the frame 23a.

Grouped about the rollers 74 and their supporting shaft 75 are three shafts 78, 79 and 80 parallel to each other and to the shaft 75, the shafts 78, 79 and 80 being rotatably mounted at their ends in the spider-frames 76 and carrying series of rollers 81, 82 and 83, respectively.

Trained about the rollers 74, except across the lower portions thereof, and over the rollers 81, 82 and 83 are parallel endless conveyor belts 84, held in the desired taut condition against the peripheral surfaces of the rollers 74 by belt-tightening rollers 85 journaled in brackets 86 pivoted on the shaft 77 and pressed against the belts 84 by springs 87 connected with the brackets 86 and with arms 88 rigid on the shaft 77.

The structure comprising the spider-frames 76 and the parts carried thereby, and the shaft 75, brackets 86 and arms 88, is thus rotatably mounted at one side of the main frame 23a adapting this structure to be swung about the axis of the shaft 77 into and out of the position shown in the drawings, in which position it rests on the main frame 23a at adjustable stops carried by the spider frames, one of these stops being shown at 89 (Fig. 2), adapting the structure referred to to be adjusted to different heights for accommodating books of different thicknesses.

The rollers 74 are positively driven in the direction of the arrow in Fig. 8 by mechanism driven from the shaft 53 and comprising a shaft 90 journaled at its ends in the frame 23a and having sprocket-chain connection 91 with the shaft 53; a gear 92 on the shaft 90 disposed between, and meshing with, gears 93 and 94 on the shafts 95 and 96, respectively, journaled in the frame 23a, a sprocket chain 97 trained about sprockets 98 and 99 on the shaft 95 and on a stub shaft 100 journaled at its ends in brackets on the frame 23a at one side of the machine, respectively; sprocket-chains 101 trained about sprockets (not shown) on the shaft 100 and on a similarly mounted stub shaft (not shown) at the other side of the machine and alined with the shaft 100, respectively, and over sprockets 102 fixed to a shaft 103 journaled at its ends in the frame 23a, respectively, the chains 101 thus operating in unison; a sprocket-chain 104 (Fig. 6) trained about a sprocket 105 on the shaft 103 and a sprocket 106 secured to a stub-shaft 107 journaled in the frame 23a; and gears 108 and 109 on the stub-shaft 107 and the shaft 75, respectively.

It may here be stated that the stacking mechanism in so far as it has been above described, operates, in the rotation of the rollers 74 to receive the book to be superposed on the next, succeeding book and carry it, by engagement of the belts 84 therewith, around these rollers to a position in which it is deposited on such succeeding book with its front edge in substantial alinement with the front edge of the book beneath it as represented in Fig. 9.

The stacking mechanism 22 also comprises means for upwardly deflecting into the bite 110 between the belts 84 and the rollers 74 the forward (folded) edges of those of the books which are to be superposed on books beneath them; these means comprising three spaced-apart book-deflector devices 111 extending beneath the rollers 74 and in registration with the spaces between certain of the belts 34.

Each of the deflector devices 111 comprises a yoke portion 112 having an upward extension 113 provided with rollers 114 which serve as the deflector portion for the books; a depending stem portion 115 which slides in an opening in a bracket 116 rigidly secured to the cross-bar 50; a coil spring 117 interposed between the bracket 116 and yoke 112 yieldingly urging the deflector device 111 upwardly to book-deflecting position; a block 118 on which the yoke 112 is slidable and through which the shaft 103 extends and in which it is rotatable; and a cam 119 having a peripheral cam-surface 120 against which a roller 121 carried by the yoke 112 bears under the action of the spring 117; it being understood that one of the cams 119 is provided for each deflector device.

The cam surfaces 120 of the cams 119 are of the same shape and size and similarly positioned axially about the shaft 103, the low portion of the one of the cams shown in Fig. 8 being represented at 122, and shown as in engagement with the one of the rollers 121 cooperating therewith, in which position of the cams 119 the several deflector devices 111 are in the uppermost, book-deflecting position.

The arrangement of the parts is such that upon the movement of each alternate book being conveyed by the belts 33 and 34, to a position beneath the rollers 74, the deflector devices 111 move upwardly to book-deflecting position (Fig. 8) and guide such books into the bite 110 between the rollers 74 and the belts 84, thereafter descending into a position in which they do not interfere with the straight-way travel of the stacks of books from the stacking mechanism to the cutting and trimming mechanism 23.

It may here be stated that where the speed at which the rollers 74 are driven produces a peripheral speed thereof equal to the speed of travel of the conveyor belts 33 and 34, and which is a condition desired to produce work of the best quality, the rollers 74 should be of a circumference equal to the distance between the back, folded edges 123 of adjacent books in their travel along the conveyor belts 33 and 34 to the stacking mechanism 22.

The machine also comprises a table top or bed 124 which extends from a point within the cutting and trimming mechanism 23 to a point adjacent the rollers 74, this top being longitudinally slotted to receive the upper reaches of the sprocket-chains 97 and 101. Thus the stacks of books 29 are driven by the rollers 74 and the belts 34 below the latter to the table top 124 into a position in which they extend across the sprocket-chains 101, which are provided at intervals with outwardly extending pusher lugs 125, spaced apart along the chains 101 a distance greater than the widest books to be operated on by the machine, viz., from the folded, back edges 123 thereof to the opposite free (front) edges thereof.

In the operation of the machine each stack of books is conveyed from the stacking mechanism 22 to the table top 124 into a position between two adjacent ones of the lugs 125 on the chains 101 the rear one of these lugs engaging the right-hand edge of the stack of books in front of it, and conveying the stack along the table top toward the cutting and trimming mechanism 23.

The conveying chains deliver the stacks of books into position to be engaged, and conveyed further, by additional conveyor (pusher) means forming a part of the conveying mechanism 21, of which the following is a description:

Located at opposite sides of the medial line of the machine and in certain of the spaces between the sprocket-chains 101 are parallel bars 126 grooved on their inner vertical surfaces as illustrated of one of the bars at 127, and slidable lengthwise in the grooves 127 and held therein against lateral displacement are slide-bars 128 each having book-engaging lugs 129 and 130 extending upwardly therefrom and through elongated slots in the table top 124 and spaced apart lengthwise of the machine substantially the same distance as the lugs 129 on the chains 101, the lugs 129 and 130 being shown as formed of interconnected angle members 131 and 132 secured to the bar 128.

As shown of one of the bars 126, each is pivotally connected at 133, adjacent its front end, with the outer end of the laterally extending arm 134 of a bell crank lever 135 fulcrumed at its angle on the frame 23a of the machine, and adjacent its rear end, as represented at 136, to the similarly positioned arm 137 of another bell-crank lever 138 fulcrumed at its angle on the frame of the machine, the depending arms 139 and 140 of these bell cranks being connected together by a link 141 pivoted thereto at its ends as represented at 142 and 143, whereby each bar 126, together with its bar 127, may be raised and lowered while maintaining it horizontal.

The fulcrum for the bell crank 135 is shown as a shaft 144 journaled in the frame 23a, the shaft 144 connecting together the bell cranks 135 for the two bars 126; and the fulcrums for the bell cranks 138 are shown as in the form of stub shafts 145 supported on brackets carried by the frame 23a. As the shaft 144 is connected with the bell cranks 135 the bars 126 are constrained to move up and down as a unit.

Pivotally connected at 146 with the arm 134 of one of the bell cranks 135 is an actuating rod 147 which straddles the shaft 95 at a yoke 147a on this rod carrying a roller 148 bearing downwardly at all times against the periphery of a peripheral cam 149 secured to the shaft 95. Thus during the rotation of the shaft 95 the rod 147 and thus the bars 126 and 127 are caused to move up and down.

The bars 128 are reciprocated in the bars 126 by means of a rock lever 150 fulcrumed near its lower end, as represented at 151, on the frame 23a and connected to the bars 128 by links 152 pivotally connected with the upper end of the lever 150 and to the bars 128 as represented at 153 and 154, respectively.

The lever 150, between its ends, is pivotally connected at 155 with the strap-member 156 of an eccentric the eccentric disk portion of which, connected with the shaft 95, is represented at 157.

The arrangement of the cam 149 and eccentric for the lever 150, is such, as shown, that the bars 126 and 128 are first started on their upward movement to raise the lugs 129 and 130 and then the bars 128 are moved to the left in Fig. 3 with their lugs 129 and 130 in engagement with successive stacks of books to accelerate the speed of movement of the latter, moving these stacks to position, respectively, for trimming the front edges of the books and cutting the two double books into four single books and trimming edges thereof; the parts of the machine being shown in the drawings in a position in which the bars 126 and 128 are about to be raised.

The cutting and trimming mechanism 23 which merely represents an example of such a mechanism, is of well known construction necessitating a brief description only thereof.

Generally it comprises a vertically movable head 158 carrying cutter knives 159, 160 and 161 supported on the head to slide lengthwise of the machine and slidable thereon, as by pivotally connecting them, at 162, to links 163, journaled on a stationary cross bar 164. Thus the knives are reciprocated lengthwise in the vertical reciprocations of the head 158.

The central knife 160 serves to cut through the stack of double books at their central portions to form four books and trim one edge of two of the books and the other knives 159 and 161 trim terminal edges of the books, leaving a remaining crosswise-extending edge on each of two of the books at the knife 160 to be trimmed later in another machine in accordance with common practice.

To the rear of the knives 159, 160 and 161 is a trimmer knife 165 extending crosswise of the machine and supported on the head 158 to be reciprocated thereon, as for example by means as described of the knives 159—161, which operates to trim the front (free) edges of the several books, a presser member 166 carried by the head 158 being provided in front of the knife 165 for firmly holding the books against slipping during the operation of this knife.

The head 158 is shown as operated to lower and effect the cutting and trimming of the books as stated while the books are at rest below it by connecting rods 167 pivotally connected with the head 158 and to crank-pins (not shown) on the shafts 95 and 96.

In order that the stacks of books will be properly positioned to be operated on by the knives referred to, two sets of stops are provided. One set is composed of two similar stops spaced apart crosswise of the machine to extend, when raised, into the path of movement of the stacks of books, one such stop being shown at 168, for positioning the books beneath the knives 159—161 and operating through openings in the table top 124, each stop 168 being provided on a bar, the bar for the stop shown being represented at 169.

The bars 169 are pivotally connected at spaced apart points with parallel links, the links for the bar shown being represented at 170 and 171 and their points of pivotal connection with the bar 169 at 172 and 173. The links 170 are connected with a rock shaft 174 journaled on the frame 26 and the links 171 with rock shafts journaled on stationary brackets on the frame, the rock shaft and bracket for the link shown being represented at 175 and 176, respectively. Thus when the rock shaft 174 is rocked both stops 168 move up or down simultaneously depending on the direction in which this shaft is rocked.

The stop bars 169 are operated by an actuating rod 177 which straddles the shaft 95 at a yoke 178 in this rod, the yoke carrying a roller 179 bearing downwardly at all times against the periphery of a peripheral cam 180 secured to the shaft 95, the cam surface of this cam being of the same shape as the cam surface of cam 149 but in a slightly different angular position about the shaft 95 to compensate for the slight convergence of the rods 177 and 196 and cause the cam surfaces of these cams to bear the same relation to their co-operating rollers 198 and 179, thereby causing the stops 168 and 181 to move in unison. Thus during the rotation of the shaft 95 the rod 177 and thus the stop bars 169 are caused to move up and down.

The set of stops above referred to for positioning the stacks of books beneath the knife 165 (each stack at this point comprising two single books as the original stacks were cut in two in the mechanism 23) is composed of four similar stops spaced apart crosswise of the machine to extend, when raised, into the path of movement of the stacks of single books, one such stop being shown at 181, each stop 181 being provided on a bar, the bar for the stop shown being represented at 182.

The bars 182 are pivotally connected at spaced apart points with parallel links, the links for the bar shown being represented at 183 and 184 and their points of pivotal connection with the bar 182 at 185 and 186. The links 183 are connected with a rock shaft 187 journaled on stationary brackets on the frame 23a, one of which is shown at 188, and the links 184 with a rock shaft 189 journaled on the brackets 188, the links 183 and 184 being adjustable along the rock shafts 187 and 189 to accommodate books of different lengths. Thus when the rock shaft 187 is rocked all of the stops 181 move up or down simultaneously depending on the direction in which this shaft is rocked.

The stop bars 182 are actuated by mechanism comprising an arm 190 rigid on the rock shaft 187; a link 191 pivotally connected at its ends to the arm 190 and to an arm 192 rigid on a rock shaft 193 journaled on the frame 26; and an arm 194 rigid on the shaft 193 and pivotally connected at 195 with the upper end of an actuating rod 196 which straddles the shaft 96 at a yoke 197 on this rod and carrying a roller 198 bearing downwardly at all times against the periphery of a peripheral cam 199 secured to the shaft 96, the cam surface of this cam being of the same shape as the cam surfaces of cams 149 and 180. Thus during the rotation of the shaft, the rod 196 and thus the stop bars 182 are caused to move up and down.

Located beyond the knife 165 are conveyor means for conveying away the stacks of books cut and trimmed by the mechanism 23, these means comprising a lower endless conveyor formed of a plurality of endless belts, one of which is represented at 200, located side by side in spaced relation and supported at their ends on rolls, one of which, shown at 201, is fixed on a shaft 202 driven, through a sprocket chain 203, by the shaft 96.

The means referred to also comprise an upper endless conveyor formed of a plurality of belts one of which is represented at 204, located side by side and in line with the belts 200 beneath them. The belts 204 are trained about rollers 205 and 206, the rollers 205 being fixed on a shaft 207 journaled in the frame 23a and continuously rapidly driven in any suitable way, and the rollers 206 being rotatable on the rock shaft 193. Arms fixed on the rock shaft 193, one of these arms being shown at 208, carry rollers journaled thereon, one being shown at 209, which, after the knife 165 rises and during the lowering of the stop-bars 182 to remove the stops 181 from the path of movement of the books (Fig. 3), press down against the stack of books beneath them in combination with the belts 200 effect feeding of the book to a position between the conveyor belts 200 and 204 which continue the feeding of the books. In the rising of the stop-bars 182 the rollers 209 rise to a position permitting a stack of books to freely enter between them and the conveyor belts 200.

In the operation of the machine the grouped signatures, stapled by the mechanism 20, are intermittently moved along the supporting bar 28 to the pusher means 71 which elevate the stapled double books 29 to the conveyor belts 33 and 34 by which the double books positioned singly, in succession, on the belts 34, move to the stacking mechanism 22 wherein the books are stacked as above explained. The books in stacked condition then move to a position in which each stack is engaged by a set of the lugs 125 on the chains 101 which operate at a speed much slower than the belts 33 and 34, advancing the stacks to a position in which they are first engaged by the pusher lugs 129 to move them against the stops 168, in which position they are operated on by the knives 159, 160 and 161, and then engaged by the pusher lugs 130 to move them against the stops 181 in which position they are operated on by the knife 165. Following this last referred to operation the rollers 209 lower to feed the books to a position in which they extend between the conveyor belts 200 and 204.

As will be understood, the stops 168 and 181 must be in lowered position, in which they do not obstruct the feeding beyond them of the stacks of books, during the initial operation of the pusher lugs 129 and 130 toward these stops but must be projected upwardly to book-stopping position before the back (folded) edges of the books, viz., the leading edges of the books, in being advanced by the pusher lugs 129 and 130, during the final movement of these lugs toward these stops, reach the locations of these stops. This is provided for in the machine shown, it being noted that whereas the cam surfaces of the cams 149 and 180 occupy the same positions relative to their cooperating rollers, the cam 149 is set in an advanced angular position about the shaft 95 and thus operates to lift the bars 126 and 128 and initiate the advancing of the pusher lugs 129 and 130 before the stops 168 and 181 rise to stop-position.

Should the books of any stack thereof be out of perfect registration in moving into engagement with the stops they will become perfectly registered when moved against them by the mechanism described, and thus each book of each stack will be cut and trimmed uniformly and to the proper size.

While I have illustrated and described a particular construction of machine for practicing my novel method and have illustrated and described a particular embodiment of my invention, I do not wish to be understood as intending to limit it thereto as the method may be practiced by the use of other forms of structure and the particular machine shown may be variously modified and altered, and the invention embodied in other forms of structure, without departing from the spirit of my invention.

What I claim as new and desire to secure by Letters Patent, is:

1. The method of feeding articles from one mechanism which operates to rapidly perform work on the articles to another mechanism which relatively slowly performs its work on the articles, which consists in feeding the articles from the first-referred-to mechanism singly, in succession, associating certain of the articles with others thereof to form stacks and feeding the articles in stacked condition at a reduced rate of speed to the second-referred-to mechanism.

2. The method of feeding articles from one mechanism which operates to rapidly perform work on the articles to another mechanism which relatively slowly performs its work on the articles, which consists in feeding the articles from the first-referred-to mechanism singly, in succession, associating certain of the articles with others thereof, while continuing the movement of the articles, to form stacks and feeding the articles in stacked condition at a reduced rate of speed to the second-referred-to mechanism.

3. The method of feeding articles from one mechanism which operates to rapidly perform work on the articles to another mechanism which relatively slowly performs its work on the articles, which consists in feeding the articles from the first-referred-to mechanism singly, in succession, associating certain of the articles with others thereof succeeding them to form stacks and feeding the articles in stacked condition at a reduced rate of speed to the second-referred-to mechanism.

4. In combination with means for feeding articles singly, in a successive arrangement, through a predetermined path, stacking means for associating certain of the articles with others thereof to form stacks, and means for feeding the stacked articles away from said stacking means operative to cause the rate of delivery of the stacked articles to a predetermined location to be less than the rate of delivery of the articles by said first-named means to said stacking means.

5. In combination with means for feeding articles singly, in a successive arrangement, through a predetermined path, stacking means for associating certain of the articles with the next succeeding articles fed by said first-named means, to form stacks, and means for feeding the stacked articles away from said stacking means operative to cause the rate of delivery of the stacked articles to a predetermined location to be less than the rate of delivery of the articles by said first-named means to said stacking means.

6. In combination with means for feeding articles singly, in a successive arrangement, through a predetermined path, stacking means comprising rotary mechanism constructed and arranged to deliver articles fed by said first-named means, to others of the articles fed by said first-named means, to form stacks, automatically operating means for delivering to said rotary mechanism the articles to be delivered by said rotary mechanism, and means to deliver the articles from said stacking means at a slower rate of speed than the rate of speed at which they are delivered to the stacking means.

7. In combination with means for feeding articles singly, in a successive arrangement, through a predetermined path, stacking means comprising rotary mechanism constructed and arranged to deliver articles fed by said first-named means to others of the articles fed by said first-named means, to form stacks, automatically operating means for delivering to said rotary mechanism alternate ones of the articles fed by said first-named means, and means to deliver the articles from said stacking means at a slower rate of speed than the rate of speed at which they are delivered to the stacking means.

8. In combination with means for feeding articles singly, in a successive arrangement, through a predetermined path, stacking means comprising a rotatable element, a belt extending part way around said element and cooperating with said element for conveying around said element articles fed by said first-named means and introduced between said element and belt and delivering them to articles on said first-named means, automatically operating means for delivering to said element the articles to be delivered by said stacking means, and means to deliver the articles from said stacking means at a slower rate of speed than the rate of speed at which they are delivered to the stacking means.

9. In combination with means for feeding articles singly, in a successive arrangement, through a predetermined path, stacking means comprising a rotatable element, a belt extending part way around said element and cooperating with said element for conveying around said element articles fed by said first-named means and introduced between said element and belt and delivering them to articles on said first-named means, and reciprocatory means operating to deliver to said element the articles to be delivered by said stacking means.

10. In combination with means for continuously feeding articles singly, in a successive arrangement, through a predetermined path, stacking means comprising rotary mechanism constructed and arranged to deliver articles fed by said first-named means to others of the articles fed by said first-named means, to form stacks, automatically operating means for delivering to said rotary mechanism the articles to be delivered by said rotary mechanism, and means to deliver the articles from said stacking means at a slower rate of speed than the rate of speed at which they are delivered to the stacking means.

11. In combination with means for feeding articles singly, in a successive arrangement, through a predetermined path, stacking means comprising rotary mechanism constructed and arranged to deliver articles fed thereto by said first-named means to others of the articles fed by said first-named means, to form stacks, automatically operating means for delivering from said first-named means to said rotary mechanism the articles to be delivered by said rotary mechanism, and means to deliver the articles from said stacking means at a slower rate of speed than the rate of speed at which they are delivered to the stacking means.

12. In combination with means for feeding articles singly, in a successive arrangement, through a predetermined path, stacking means for associating certain of the articles with others thereof, to form stacks, means for feeding the stacked articles, and stop means against which the stacks of articles are fed by said third-named means, operative to insure the registration of the articles in each stack.

13. In combination with means for feeding articles singly, in a successive arrangement, through a predetermined path, stacking means comprising a structure supported to be swung lengthwise of, and relative to said first-named means, means limiting the movement of said structure toward said first-named means, rotary mechanism on said structure constructed and arranged to deliver articles fed by said first-named means to others of the articles fed by said first-named means, and means operating to deliver to said rotary mechanism the articles to be delivered by said rotary mechanism.

14. The method of stacking articles while being conveyed singly, in succession, which comprises upwardly displacing selected ones of the articles and superposing them upon others of the articles to form stacks, and continuing the feeding of the articles in stacks at a slower speed than that at which they are conveyed singly.

15. In combination with means for feeding articles singly in a successive arrangement, through a predetermined path, stacking means comprising rotary mechanism constructed and arranged to deliver articles fed by said first-named means, into superposed position on others of the articles fed by said first-named means, means for feeding the resulting stacks at a reduced rate of speed, and means operating to deliver to said rotary mechanism the articles to be delivered by said rotary mechanism.

16. The method of stacking articles while being conveyed singly, in succession, which comprises displacing selected certain ones only of the articles and associating them with others of the articles to form stacks, and continuing the feeding of the articles in stacks at a reduced rate of speed.

17. The method of stacking articles while being conveyed, in succession, which comprises displacing selected certain ones only of the articles and associating them with succeeding ones of the articles to form stacks, and continuing the feeding of the articles in stacks at a reduced rate of speed.

18. The method of stacking articles while being conveyed singly, in succession, which comprises displacing selected certain ones only of the articles and associating them with the next succeeding ones of the articles to form stacks, and continuing the feeding of the articles in stacks at a reduced rate of speed.

19. The method of stacking articles while being conveyed singly, in succession, which comprises displacing selected ones of the articles and moving them in a substantially endless path to a position in which they become associated with others of the articles to form stacks, and continuing the feeding of the articles in stacks at a reduced rate of speed.

20. The method of stacking articles while being conveyed singly, in succession, which comprises displacing selected ones of the articles and moving them while continuing the movement of the articles in a substantially endless path to a position in which they become associated with others of the articles to form stacks, and continuing the feeding of the articles in stacks at a reduced rate of speed.

21. The method of feeding articles from one mechanism which performs work on the articles to another mechanism which performs work on the articles at a lesser capacity, which consists in feeding the articles from one mechanism to the other mechanism while reducing the rate of feed of the articles to accord with the capacity of the last mentioned mechanism, said feeding including stacking of the articles from a singly and successively fed condition.

ROBERT D. EASTON.